Figure 1:
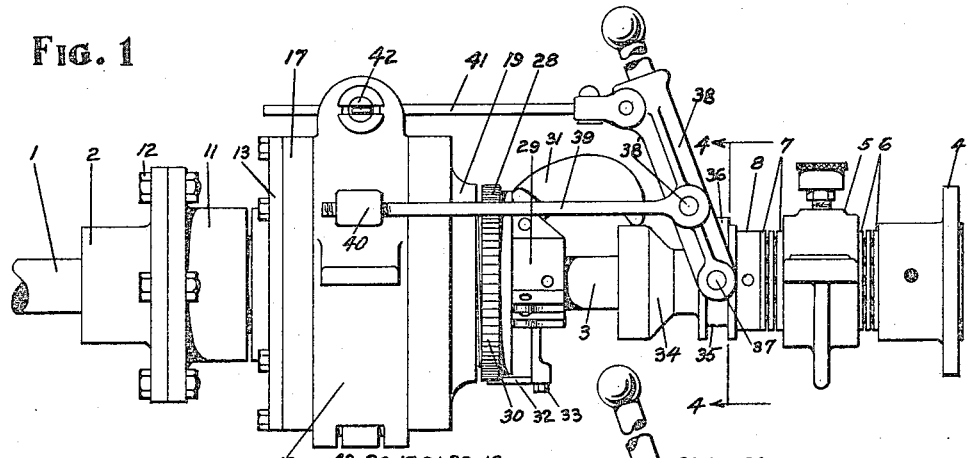
Figure 2:
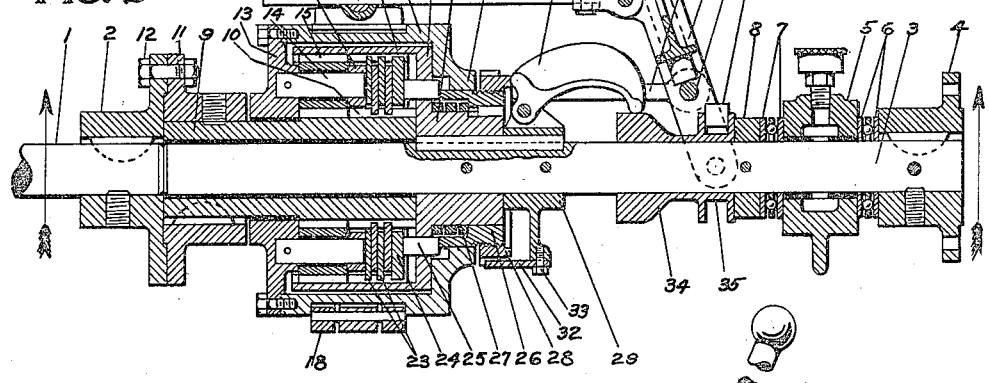
Figure 3:
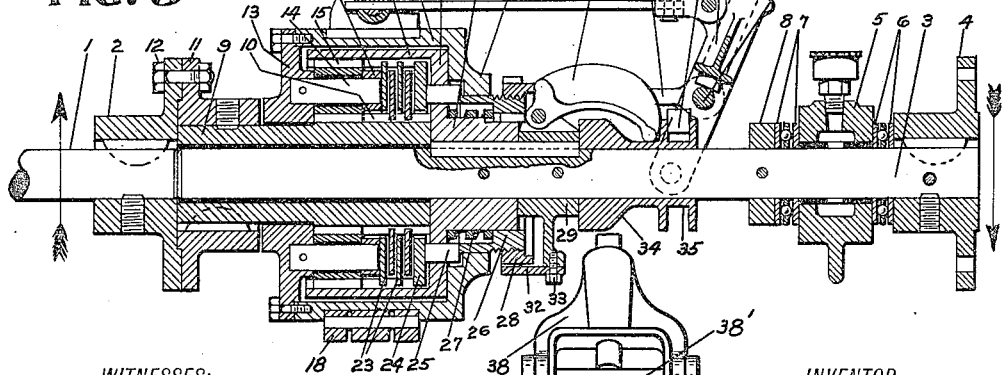
Figure 4:
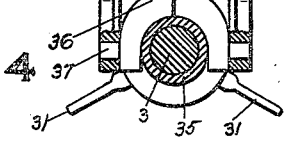

H. J. PERKINS.
REVERSE GEAR MECHANISM.
APPLICATION FILED SEPT. 20, 1915.

1,169,425.

Patented Jan. 25, 1916.

WITNESSES:
a. J. Koon
O. P. Sears

INVENTOR
Harry J. Perkins.
BY
Chappell Earl
ATTORNEY

UNITED STATES PATENT OFFICE.

HARRY J. PERKINS, OF GRAND RAPIDS, MICHIGAN.

REVERSE-GEAR MECHANISM.

1,169,425.

Specification of Letters Patent. Patented Jan. 25, 1916.

Application filed September 20, 1915. Serial No. 51,624.

*To all whom it may concern:*

Be it known that I, HARRY J. PERKINS, a citizen of the United States, residing at Grand Rapids, Michigan, have invented certain new and useful Improvements in Reverse-Gear Mechanisms, of which the following is a specification.

This invention relates to improvements in reverse gear mechanisms.

The objects of this invention are: First, to provide an improved mechanism for actuating the clutch means without axial movement of the gear case or gear and other associated parts. Second, to provide an improved arrangement of clutch mechanism in a reverse gear, which shall be very compact and strong. Third, to provide a structure of reverse gear in which the adjustment is simple and effective.

Further objects, and objects relating to details and economies of construction and operation will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side elevation of my improved reverse gear mechanism, the driven shaft being broken away and details of the support and the like being omitted. Fig. II is a longitudinal vertical sectional view through the mechanism, certain parts being shown in full lines, the same being shifted for direct drive. Fig. III is a longitudinal sectional view similar to that of Fig. II, the same being shifted for the reverse drive. Fig. IV is a detail vertical sectional view through the sliding cone on a line corresponding to line 4—4 of Fig. I.

In the drawing, similar reference characters refer to similar parts throughout the several views, and the sectional views are taken looking in the direction of the little arrows at the ends of the section lines.

Considering the numbered parts of the drawing, *i* is the driving shaft, which may be the crank shaft of an engine, or any suitable power shaft, and is provided with a coupling flange 2.

3 is the driven shaft which is provided with a coupling flange 4.

5 is the bearing block in which the driven shaft 3 is supported, provided with thrust bearings 6 and 7 at each side, which are engaged by the flange 4 and the collar 8 respectively, which collar and flange are pinned, keyed, or otherwise secured to the said driven shaft.

9 is a sleeve which turns on shaft 3 and is provided with elongated spur gear teeth 10 at one end. On the other end of the shaft 9 is rigidly keyed a coupling flange 11. This flange is connected to flange 2 by bolts 12 and is held against thrust by a set screw or otherwise.

13 is the gear cage carrying journal pins 14 on which are mounted or journaled the planetary pinions 15.

16 is the supporting ring at the inner ends of the pins 14 and carried by bridge bars (not shown) of the gear cage 13.

17 is the outer casing within which is disposed the gear cage 13, the same being secured thereto and flanged to constitute the cover for one end. The casing 17 is disposed within and supported by the reverse brake band 18. The casing 17 is extended into a hub 19 integral therewith which is suitably recessed for the accommodation of the actuating pins for the clutch hereinafter to be described.

An internal orbit gear 20 is provided which is disposed to mesh with the planetary pinions 15 and extends beyond the same to form a chamber to receive the clutch. The crown 21 of the gear is perforated for the passage of the axially disposed clutch actuating pins hereafter to be described. The crown 21 is extended into a hub 22 and is securely keyed and pinned to the shaft 3.

A frictional clutch comprising disks 23, which alternately are notched to engage the spur gear 9 or the internal gear 20, are disposed within the chamber of the crown 21 of internal gear 20 and coact with the ring 16 at the inner end of the gear cage.

In the perforations of the crown 21 of the gear 20 longitudinally slide the axially disposed clutch actuating pins 25. These pins bear against thrust ring 26. The thrust ring 26 is disposed between hub 19 of casing 17 and the hub 22 of the internal gear 20. The thrust ring is suitably keyed to hub 22 and adapted to slide back and forth thereon. This bearing ring is further recessed so as to retain a coiled spring 27 which fits over hub 22 and reacts against the crown 21 and holds said thrust ring yieldingly outward. On the thrust ring 26 is a screw threaded external bearing ring 28, the outside of this ring having notches 30.

Disposed on driven shaft 3 and rigidly keyed and pinned thereto, is collar 29 and on this collar the toggle levers 31 are disposed and fulcrumed, so as to act upon the bearing ring 28 to actuate the thrust ring 26 which in turn act upon the clutch actuating pins 25. The outer bearing ring 28 may be set at any position on the inner thrust ring 26 and is securely held thereon by locking finger 32 which bears in one of the notches 30. Said locking finger is fastened to the collar 29 by a screw 33 and journaled upon the shaft 3 between the collar 29 and collar 8 is the sliding cone 34. One end of this cone terminates in the annulus 35. Within this annulus are two quarter collars 36 journaled at 37 in the fork of control lever 38.

Control lever 38 is fulcrumed between two supporting rods 39 which screw into lugs 40 of brake band 18 by pin 38'. A connection 41 from the control lever 38 actuates the cam means 42 for controlling the reverse brake band 18. These parts do not need detailed description because they appear in detail and are described in my co-pending application Serial No. 14,363, filed March 15, 1915, as do certain other details which I have not described minutely at this point for that reason.

The toggle means for manipulating the clutch can be varied. The connections for operating the brake band may be of any desired or well known construction, and therefore I have not described the same in detail at this point. I have only indicated these parts sufficiently for the purpose of actuation. I also desire to state that the proportions of the gears and pinions can be greatly varied herein and corresponding changes in the other parts to accommodate them. Modifications and details, it will be seen, can be readily made within the scope of the claims without departing from the spirit of my invention.

The advantages of operation of my improved structure will thus readily appear. There is no axial movement of any of the gears or of the casing. When the control lever is thrown to the position indicated in Fig. II, the cone 34 raises toggle levers 31 to the position there indicated and this exerts pressure through the bearing ring 28 and thrust ring 26 upon the clutch actuating pins 25 which coact with the disks of the disk clutch thereby clutching the parts together so that they revolve freely within the reverse brake band which reverse brake band will have been opened by the operation of the connection 41.

From this description it is clear that no parts have been acted upon by the toggle lever except the clutch means. When the control lever is thus shifted the brake band is released and the parts clutch without any interference with the gears. The driving shaft is connected through the spur gear and gear cage and the clutch and internal gear direct to the driven shaft.

When the control lever is shifted to the position indicated in Fig. III, the reverse brake band is tightened and the clutch by the reverse mechanism of the toggle, is released and the pinions of the planetary gears act to reverse the driven shaft and drive the same at a lower rate of speed, as is usual in such reverse gears when used for marine purposes. When the control lever is intermediate both band brake and clutch are released and the neutral action is secured.

By this structure, it is not necessary to provide finished bearing surfaces on either of the gears to coöperate with the clutch means, and because the internal gear need not be reciprocated, it can be pinned or effectively secured to the driven shaft. When so secured and fitted within the case to run freely, the internal gears serve as additional support for the shaft, which, with the central bearing support preserves perfect alinement and a very strong support for the driven shaft. This is an important feature, as it enables very compact construction and avoids the unnecessary finishing of parts. The adjustable bearing ring on the thrust ring is of the highest consequence in securing precise action of the parts.

Having thus described my invention, what I claim as new and desire to secure by Letters Patent is:

1. In a reverse gear mechanism, the combination of a driving shaft, a driven shaft, a planetary gear cage with pinions therein carried by the driven shaft, a brake drum casing disposed around the same, an orbit gear with a hub on said driven shaft disposed within the casing and meshing with the planetary gear pinions within said case, a disk clutch disposed within the crown of said gear to coact between the same and the said planetary gear cage, thrust pins disposed in perforations through the crown of said gear, a thrust collar with an internal annular recess disposed on the hub of said orbit gear, a spring within the recess in said collar disposed to react against said crown, an adjustable screw threaded bearing ring on the said thrust ring, a collar with toggle levers thereon, a sliding cone journaled on the driven shaft to actuate the toggle levers, a control lever for controlling said cone, coacting for the purpose specified.

2. In a reverse gear mechanism, the combination of a driving shaft, a driven shaft, a planetary gear cage with pinions therein carried by the driven shaft, a brake drum casing disposed around the same, an orbit gear with a hub on said driven shaft disposed within the casing and meshing with the planetary gear pinions within said case, a disk clutch disposed within the crown of said gear to coact between the same and the said planetary gear cage, thrust pins disposed in perforations through the crown of said gear, a thrust collar disposed on the hub of said orbit gear, an adjustable screw threaded bearing ring on the said thrust ring, a collar with toggle levers thereon, a sliding cone journaled on the driven shaft to actuate the toggle levers, a control lever for controlling said cone, coacting for the purpose specified.

3. In a reverse gear mechanism, the combination of a driving shaft, a driven shaft, a planetary gear cage with pinions therein carried by the driven shaft, a brake drum casing disposed around the same, an orbit gear with a hub on said driven shaft disposed within the casing and meshing with the planetary gear pinions within said case, a disk clutch disposed within the crown of said gear to coact between the same and the said planetary gear cage, thrust pins disposed in perforations through the crown of said gear, a thrust collar with an internal annular recess disposed on the hub of said orbit gear, a spring within the recess in said collar disposed to react against said crown, a collar with toggle levers thereon, a sliding cone journaled on the driven shaft to actuate the toggle levers, a control lever for controlling said cone, coacting for the purpose specified.

4. In a reverse gear mechanism, the combination of a driving shaft, a driven shaft, a planetary gear with reverse brake and clutch, a thrust ring for actuating said clutch, a screw threaded bearing ring on said thrust ring, a collar with toggle levers fulcrumed to act on said thrust ring, a locking finger carried by said collar for locking the thrust ring in adjusted position, as specified.

5. In a reverse gear mechanism, the combination of a driving shaft, a driven shaft, a planetary gear with reverse brake and clutch, a recessed thrust ring for actuating said clutch, a spiral spring disposed within said recess to force said ring outward, a control lever and connections to act on said thrust ring, as specified.

In witness whereof, I have hereunto set my hand and seal in the presence of two witnesses.

HARRY J. PERKINS. [L. S.]

Witnesses:
E. M. HELWIG,
WM. F. HEMMINGHAUS.

Copies of this patent may be obtained for five cents each, by addressing the "Commissioner of Patents. Washington, D. C."